United States Patent
Brandl

(10) Patent No.: US 7,637,019 B2
(45) Date of Patent: Dec. 29, 2009

(54) ROTARY ENCODER

(75) Inventor: Alois Brandl, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 41 days.

(21) Appl. No.: 11/944,182

(22) Filed: Nov. 21, 2007

(65) Prior Publication Data
US 2008/0120850 A1   May 29, 2008

(30) Foreign Application Priority Data
Nov. 28, 2006   (DE)   ................... 10 2006 056 462

(51) Int. Cl.
  *G01B 21/00*   (2006.01)
  *G01B 7/30*   (2006.01)
(52) U.S. Cl. ........................ 33/1 PT; 33/1 N; 33/706; 250/231.13
(58) Field of Classification Search ................. 33/1 PT, 33/1 N, 706–708; 250/231.13
See application file for complete search history.

(56) References Cited

U.S. PATENT DOCUMENTS

| | | | | |
|---|---|---|---|---|
| 4,794,250 A | * | 12/1988 | Togami | 250/231.13 |
| 4,942,295 A | * | 7/1990 | Brunner et al. | 250/231.13 |
| 5,057,684 A | * | 10/1991 | Service | 250/231.13 |
| 5,708,496 A | * | 1/1998 | Barnett et al. | 356/28 |
| 6,111,402 A | | 8/2000 | Fischer | 324/207.17 |
| 6,194,710 B1 | * | 2/2001 | Mitterreiter | 250/231.14 |
| 6,311,402 B1 | * | 11/2001 | Brandl et al. | 33/1 PT |
| 6,452,160 B1 | | 9/2002 | Mitterreiter | 250/231.18 |
| 7,205,530 B2 | * | 4/2007 | Jones | 250/231.13 |
| 7,339,158 B2 | * | 3/2008 | Mutschler et al. | 250/231.13 |
| 7,392,588 B2 | * | 7/2008 | Brandl | 33/1 PT |
| 7,470,889 B2 | * | 12/2008 | Jones et al. | 250/231.13 |

FOREIGN PATENT DOCUMENTS

| | | |
|---|---|---|
| DE | 197 51 853 | 6/1998 |
| EP | 0 973 014 | 1/2000 |

* cited by examiner

Primary Examiner—Amy Cohen Johnson
(74) Attorney, Agent, or Firm—Kenyon & Kenyon LLP

(57) ABSTRACT

A rotary encoder includes a first component group and a second component group, the two component groups being rotatably arranged relative to each other in a measuring operation. The first component group has a detector system, a housing part having at least one wedge-shaped element, and a clamping ring having at least one cam. The second component group includes a code disk and a shaft. The housing part is arranged radially outside of the shaft, and a force having a radial directional component oriented toward the axis is applicable on the at least one wedge-shaped element via the at least one cam by a turning motion of the clamping ring relative to the housing part such that the shaft is able to be clamped on the housing part outside of the measuring operation.

16 Claims, 4 Drawing Sheets

ROTARY ENCODER

CROSS-REFERENCE TO RELATED APPLICATIONS

The present application claims priority to Application No. 10 2006 056 462.6, filed in the Federal Republic of Germany on Nov. 28, 2006, which is expressly incorporated herein in its entirety by reference thereto.

FIELD OF THE INVENTION

The present invention relates to a rotary encoder, in particular, a rotary encoder for determining relative angular positions.

BACKGROUND INFORMATION

Rotary encoders are frequently used to determine the angular position of two machine parts, which are rotatable relative to each other, and operate according to an inductive measuring principle, for example. In inductive rotary encoders, exciter coils and receiver coils are applied, for example, in the form of circuit traces, on a shared circuit board, which is permanently joined to a stator of the rotary encoder, for example. Arranged across from this circuit board at a defined axial distance and centered is another board, which takes the form of a code disk, on which alternating electrically conductive and non-conductive surfaces are mounted at periodic intervals as a scale-division region or scale-division structure, and which is joined to the rotor of the rotary encoder in a rotatably fixed manner. If an electric exciter field, which is alternating over time, is applied to the exciter coils, then signals are generated in the receiver coils as a function of the angular position during the relative rotation between rotor and stator. These signals are processed further in an evaluation electronics.

Such rotary encoders are frequently used as measuring devices for electrical drives to determine the absolute angular position of respective drive shafts.

European Patent No. 0 973 014 describes an arrangement for a rotary encoder, in which the axial distance between a detector system and a code disk is locked by a bow-shaped element, which clamps a rotary encoder shaft in a form-locking manner by a radial longitudinal displacement. Such devices have the disadvantage, among other things, that they require for their actuation a comparatively large amount of space in the radial direction.

SUMMARY

Example embodiments of the present invention provide a rotary encoder, in which it is possible to lock and release an axial distance between a detector system and a code disk, in particular little space being required for this purpose.

According to example embodiments of the present invention, the rotary encoder includes a first component group and a second component group, the two component groups being rotatably arranged relative to each other in a measuring operation. The first component group has a detector system, a housing part having at least one wedge-shaped element, and a clamping ring having at least one cam. The second component group includes a shaft and a code disk. For the purpose of determining the relative angular position of the two components groups with respect to each other, the detector system that is arranged at an axial distance from the code disk is able to scan the code disk in a measuring operation. The housing part is arranged radially outside of the shaft and, in particular, surrounds the shaft completely, that is, it encloses the latter over its entire circumference. By turning the clamping ring relative to the housing part, it is possible to apply a force having a radial directional component toward the axis via the at least one cam on the at least one wedge-shaped element such that the shaft is able to be clamped on the housing part outside of the measuring operation. In particular, in this state, the rotary encoder, which may be arranged, e.g., without a bearing, may be transported safely prior to being mounted.

It should be understood that without a bearing means that the first component group is located across from the second component group without bearing, that is, without a bearing in the rotary encoder.

The clamping ring may have several cams, several wedge-shaped elements being arranged on the housing part and the surfaces of the wedge-shaped elements facing the shaft being shaped concavely. In this configuration, the wedge-shaped elements may thus be arranged staggered along the outer circumference of the shaft and for clamping be moved by the cams radially in the direction of the axis. Thus a uniform application of force is achieved. In particular, the forces applied by the wedge-shaped elements onto the shaft compensate each other such that they add up to zero such that no resulting force is produced that could cause the axis to shift radially. Accordingly, by fixing the clamping, this arrangement also allows for the code disk to be centered relative to the detector system.

The clamping ring may be detachably joined to the housing part. In this instance, however, the at least one wedge-shaped element may be permanently joined to the housing part.

It may be possible to clamp the shaft on the housing part by a friction lock, e.g., without there being a form lock.

The rotary encoder may be configured such that it operates according to an inductive measuring principle. For precision when using this measuring principle, it is especially important that the axial distance between the detector system and the code disk is exactly adjusted. Example embodiments of the present invention readily allow for this adjustment to be performed with precision in the factory of the manufacturer of the rotary encoder and to lock the axial distance such that it does not become maladjusted during the transport to the operator of the rotary encoder. Only after mounting the rotary encoder may the lock be released. In the case of a rotary encoder according to an inductive measuring principle, the detector system may take the form of a circuit board having exciter and receiver circuit traces. Furthermore, the code disk may have electrically conductive and non-conductive scale-division regions arranged in alternation.

Further details and aspects of example embodiments of the present invention are described in more detail below with reference to the appended Figures.

DETAILED DESCRIPTION

Figure 1:
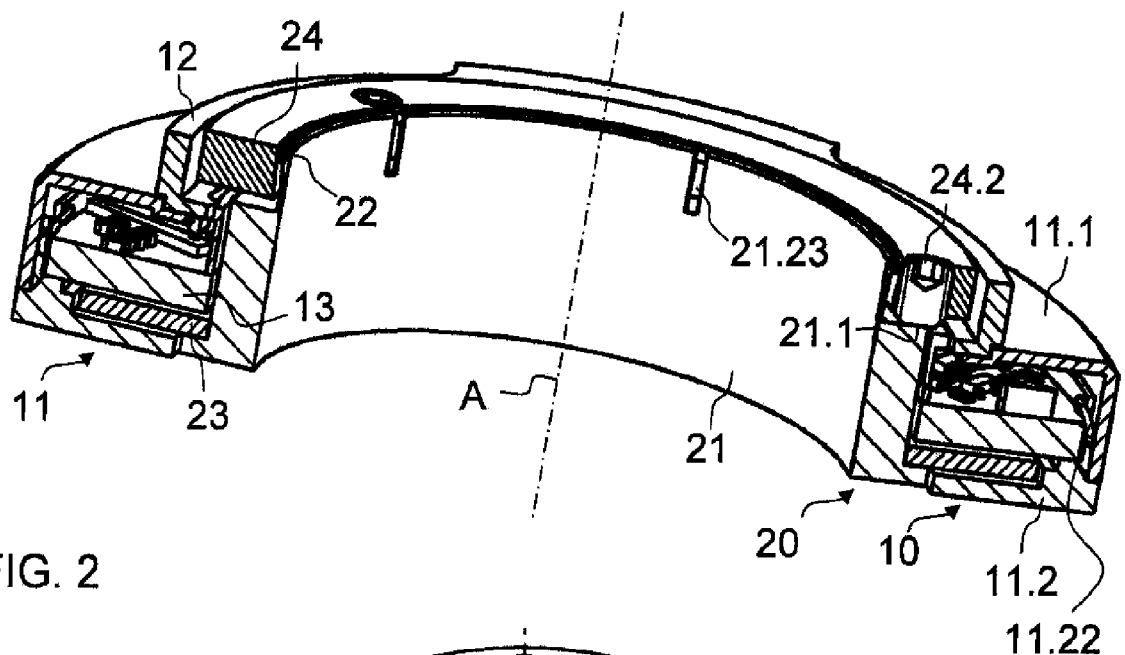
FIG. 1 is a perspective cross-sectional view through a rotary encoder according to an exemplary embodiment of the present invention.
Figure 2:
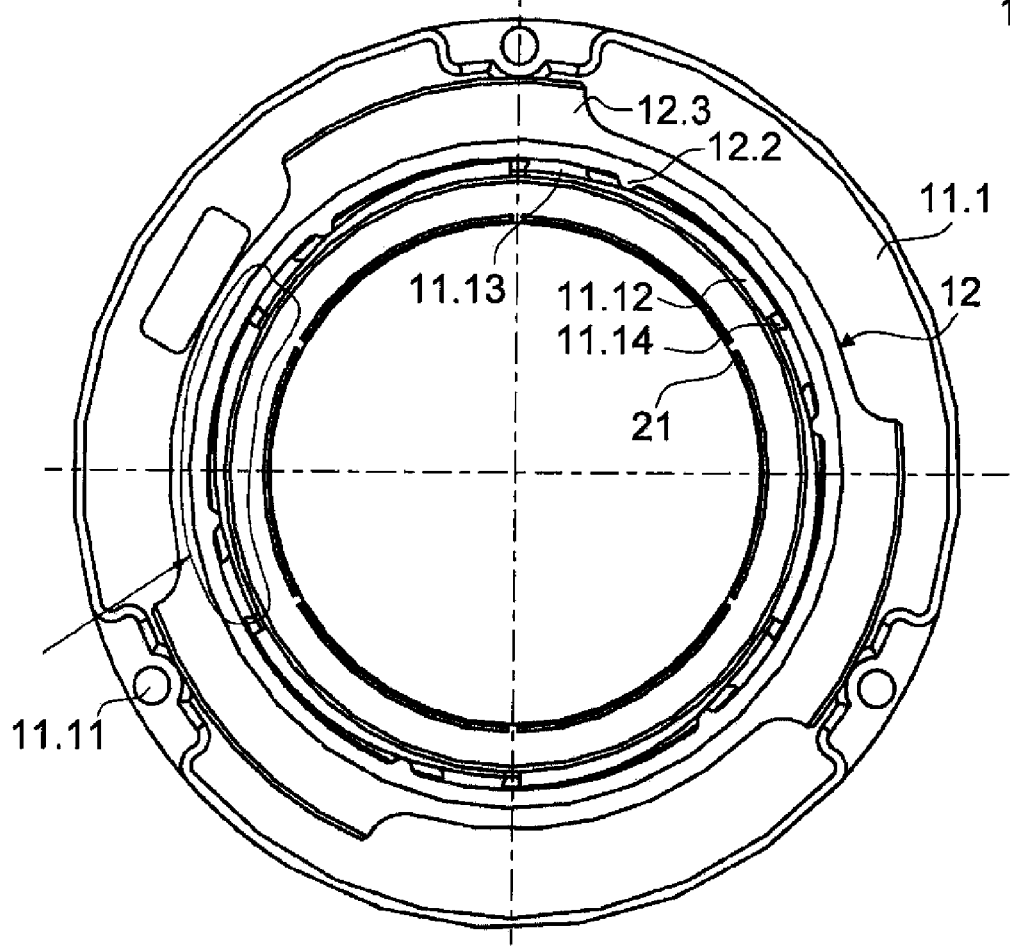
FIG. 2 is a top view onto the rotary encoder without a ring element.

FIG. 1 is a cross-sectional view through a rotary encoder according to an exemplary embodiment of the present invention. The rotary encoder includes a first component group, e.g., arranged as a stator 10, and a second component group, e.g., arranged as a rotor 20. In a measuring operation, rotor 20 and stator 10 are situated rotatably relative to each other about an axis A.

Figure 5A:
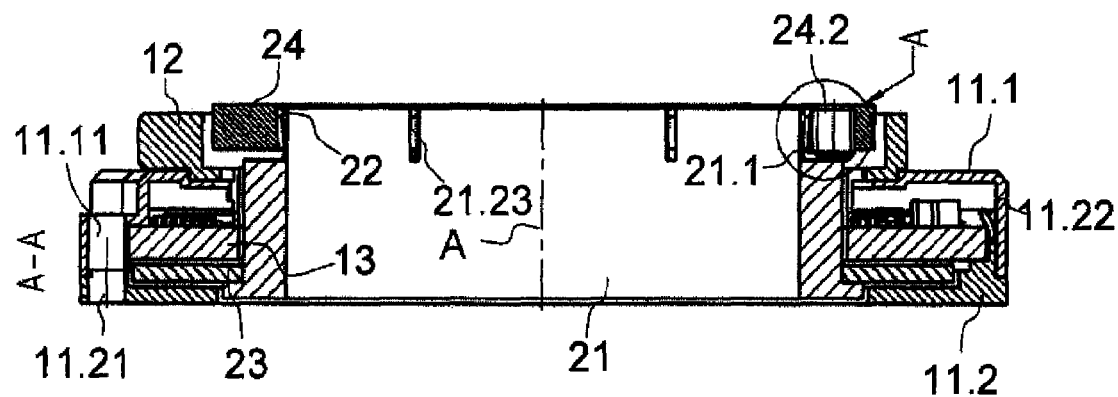
FIG. 5a is a cross-sectional view through the rotary encoder.
Figure 5B:
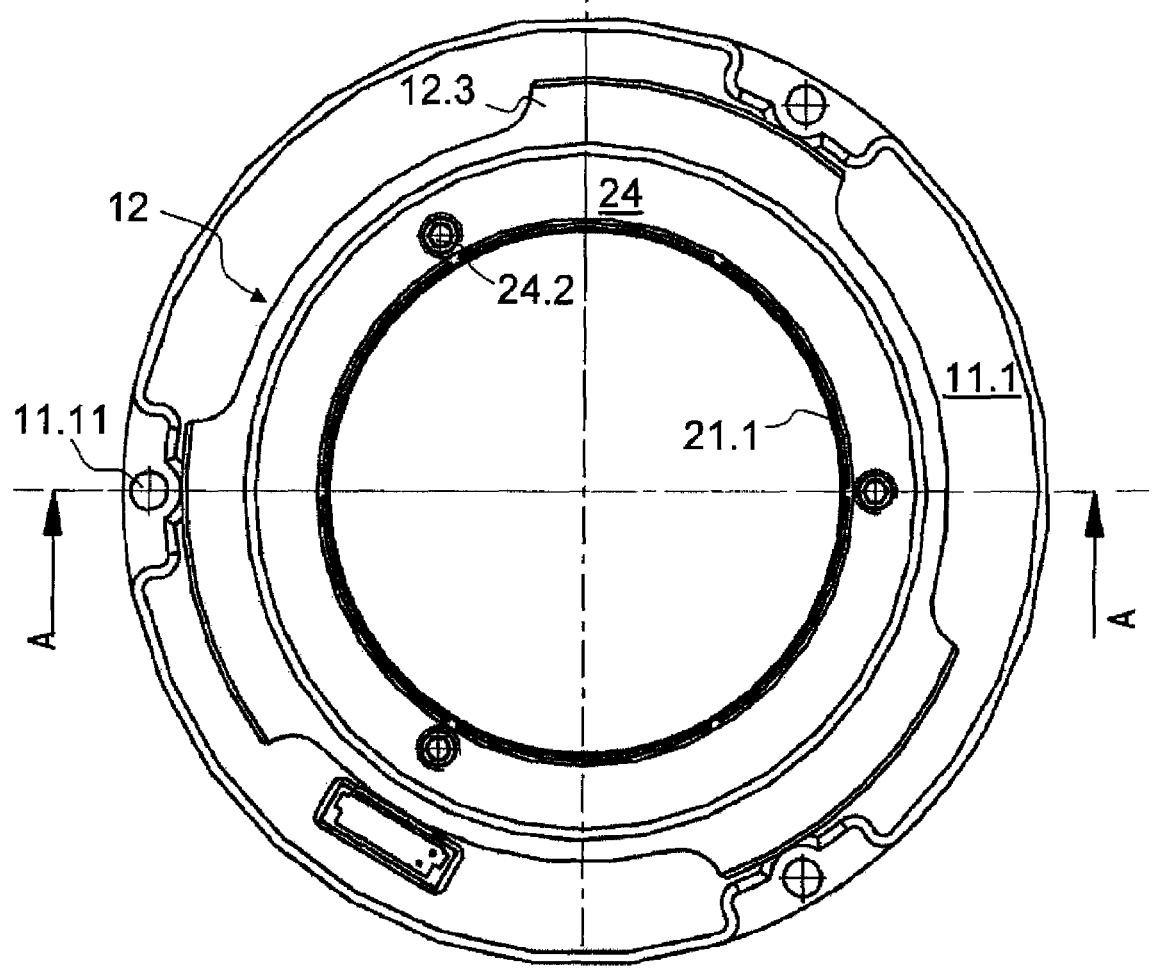
FIG. 5b is a top view of the rotary encoder including the ring element.

Stator 10 includes a two-part housing 11, which, as illustrated in FIG. 1, includes an upper first housing part 11.1 and a lower second housing part 11.2. Stator 10 may be fixed to a housing of a motor, for example, with the aid of bore holes 11.11, 11.21 (see, e.g., FIG. 5a). In this exemplary embodiment, the rotary encoder operates according to an inductive measuring principle. Accordingly, a detector system is arranged on stator 10 in the form of a circuit board 13 and is joined by a flange 11.22 in a rotatably fixed manner to second housing part 11.2.

German Published Patent Application No. 197 51 853, for example, explains the functional principle of an inductively operating rotary encoder and is expressly incorporated herein in its entirety by reference thereto. On a circuit board 13, as receiver coils, receiver circuit traces are provided in an inner receiver track, and additional receiver circuit traces are provided in an outer receiver track. In addition, exciter circuit traces are provided as exciter coils on circuit board 13, which are applied on an inner, a center and an outer exciter track. Circuit board 13 itself has a central bore hole and is multilayered.

In the exemplary embodiment illustrated, rotor 20 includes a shaft that takes the form of a hollow shaft 21. A motor shaft, for example, may be inserted and fixed in the central bore hole of hollow shaft 21 in order for the rotary encoder to ascertain the relative angular position of the motor shaft with respect to the housing of the motor. Hollow shaft 21 is a rotationally symmetric body and includes a shoulder 21.1 and a comparatively thin-walled ridge 21.2. Ridge 21.2 includes a groove 21.21, an outer surface 21.22 that is conical in the radial direction, and slots 21.23.

Furthermore, an annular code disk 23 is secured in a rotatably fixed manner on rotor 20, e.g., on its hollow shaft 21. Code disk 23 includes a substrate, which in the illustrated exemplary embodiment is made of epoxide resin and is situated on the two scale-division tracks. The scale-division tracks have an annular shape and with respect to axis A are situated concentrically on the substrate at different diameters. Each of the two scale-division tracks includes a periodic sequence of alternating electrically conductive scale-division regions and non-conductive scale-division regions. As a material for the electrically conductive scale-division regions, copper is applied onto the substrate in the example illustrated. In the non-conductive scale-division regions, by contrast, the substrate is not coated. In the example embodiment illustrated, the inner scale-division track includes a first semi-annular scale-division region having electrically conductive material, e.g., copper, as well as a second semi-annular scale-division region in which no conductive material is provided. Radially adjacent to the first scale-division track there is the second scale-division track on the substrate, the second scale-division track also including a plurality of electrically conductive scale-division regions and non-conductive scale-division regions situated in between. In this instance, the various scale-division regions are configured in terms of material in the same manner as the scale-division regions of the first scale-division track. The second scale-division track in the exemplary embodiment illustrated includes, e.g., thirty-two periodically arranged, electrically conductive scale-division regions and accordingly thirty-two non-conductive scale-division regions arranged in between.

Code disk 23 and circuit board 13 are located across from each other at an axial distance such that axis A extends through the center points of code disk 23 and circuit board 13 and that, in the event of a relative rotation between code disk 23 and circuit board 13, a signal is able to be generated in circuit board 13 by induction effects as a function of the respective angular position. According to this measuring principle, circuit board 13 is able to scan code disk 23 in a measuring operation in order to determine the relative angular position of rotor 20 and stator 10 with respect to each other.

The precondition for forming corresponding signals is that the exciter circuit traces generate an electromagnetic exciter field that alternates over time in the region of the scanning tracks or in the region of the scale-division tracks scanned thereby. In the exemplary embodiment illustrated, the exciter circuit traces take the form of multiple planar-parallel, current-carrying, individual circuit traces. If the exciter circuit traces of a circuit trace unit all carry a current in the same direction, a tubular or cylindrical directed electromagnetic field is formed around the respective circuit trace unit. The field lines of the resulting electromagnetic field extend in the form of concentric circles around the circuit trace units, the direction of the field lines depending in a conventional manner on the direction of the current in the circuit trace units.

Before the measuring operation can be initiated, however, the axial distance between code disk 23 and circuit board 13 must be adjusted as precisely as possible. The rotary encoder has no bearing of its own, that is, it is arranged without a bearing, such that, prior to mounting on the motor shaft and on the housing of the motor, code disk 23 and circuit board 13 are displaceable with respect to each other axially and to a small extent also radially. On the other hand, particularly in connection with the inductive measuring principle, a correct axial distance and proper centering are decisive for the size of the signal amplitudes and thus for the quality of the measuring result. For this reason, in the exemplary embodiment illustrated, an optimal adjustment of the axial distance and the relative centricity between code disk 23 and circuit board 13 is performed in the factory of the manufacturer of the rotary encoder, and afterwards code disk 23 and circuit board 13 are locked relative to each other such that this adjustment is not lost or disturbed during the transport to the operator of the rotary encoder. In the course of mounting the rotary encoder, the lock is released in a final step, an optimized axial distance and an optimized centering being provided for the measuring operation.

For the purpose of locking, the rotary encoder includes a clamping ring 12 made of plastic having a guiding surface 12.1, cams 12.2, radial projections 12.3 and clip catches 12.4. First housing part 11.1 furthermore has curved wedge-shaped elements 11.12, which are connected to the main body of first part 11.1 via a crosspiece 11.13. Viewed in the radial direction, curved wedge-shaped elements 11.12 have convex surfaces on the outside and concave surfaces on the inside. Due to slots 11.14, curved wedge-shaped elements 11.12 are set apart from each other in the circumferential direction and are radially movable with respect to one another. With all its components, e.g., wedge-shaped elements 11.12, first housing part 11.1 is manufactured from plastic in one piece as an injection-molded part.

Figure 3:
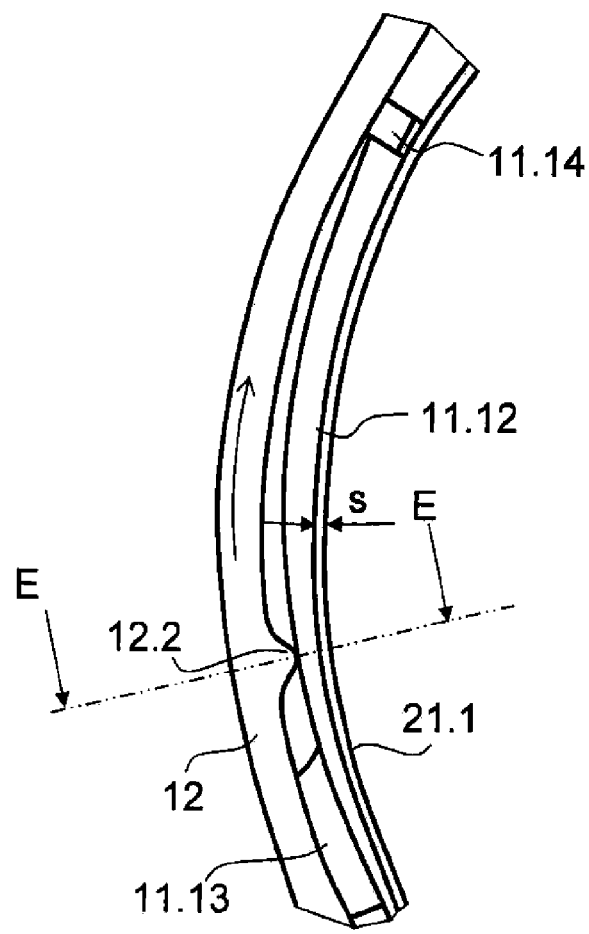
FIG. 3 is a detailed view of a transport securing system.
Figure 4:
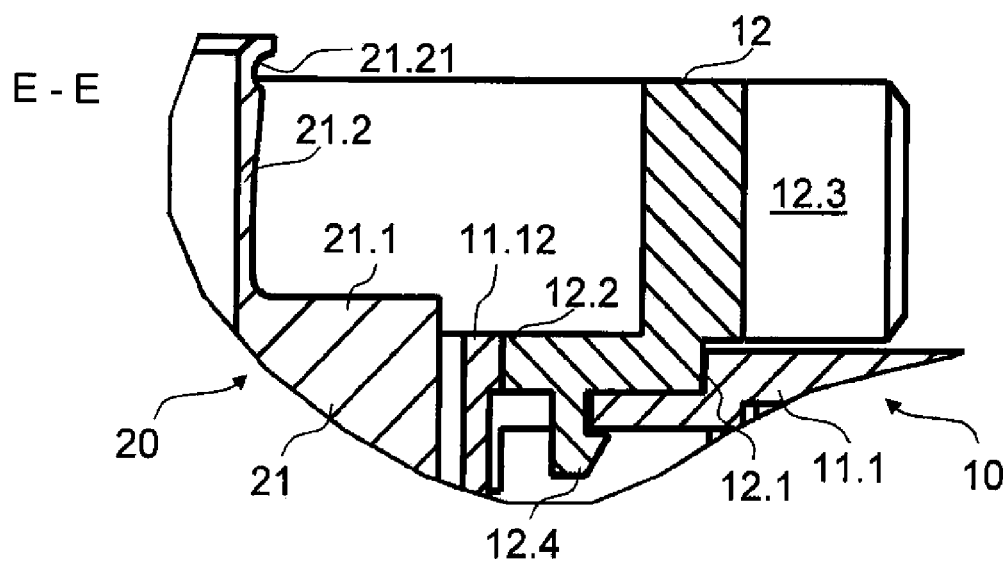
FIG. 4 is a partial cross-sectional view of a region of the transport securing system.

As illustrated in FIG. 4, at the factory prior to an adjustment, clamping ring 12 is joined to first housing part 11.1 in detachable fashion using a clip connection, e.g., in a position in which cams 12.2 touch wedge-shaped elements 11.12 in their radially narrow regions (see, e.g., FIG. 3). Accordingly, an air gap s exists between hollow shaft 21 and wedge-shaped elements 11.12 such that, relative to stator 10, rotor 20 is rotatable and within certain limits axially displaceable. Next, hollow shaft 21 is displaced axially relative to housing 11 until a testing device connected to the rotary encoder signals an optimum signal quality. Accordingly, the axial distance between code disk 23 and circuit board 13 is optimally adjusted.

In this state, clamping ring 12 is twisted, as illustrated in FIG. 3, clockwise relative to first housing part 11.1, it being possible to act upon radial projections 12.3 for better control. This twisting motion has the effect that cams 12.2 press wedge-shaped elements 11.12 radially inward since the latter are adapted to be radially flexible. Corresponding slots 11.14 are provided to increase the elasticity of wedge-shaped elements 11.12. In this manner, air gap s is reduced to zero and wedge-shaped elements 11.12 clamp stator 10 on rotor 20 to prevent a relative axial displacement. At the same time, the all-round symmetric application of force on hollow shaft 21 automatically results in centering code disk 23 relative to circuit board 13.

In this connection, one must consider that the region of hollow shaft 21, on which the concave regions of wedge-shaped elements 11.12 act, represents a cylindrical lateral surface, which has no projection in that region. Accordingly, the clamping is provided merely by friction locking. To increase the retention forces of the clamping, one or both surfaces, for example, the cylindrical lateral surface and/or the concave regions of wedge-shaped elements 11.12, may be roughened. For example, a knurl or other roughened surface structure may be provided for this purpose.

Thus the adjustment may be performed with stepless refinement. In this state, rotor 20 is no longer rotatable relative to stator 10. The rotary encoder accordingly may be transported safely without the axial distance that is fixed in the factory becoming maladjusted.

In the course of mounting the rotary encoder on a motor, the motor shaft is inserted into hollow shaft 21 of the rotary encoder. Next, housing 11 is fastened to the housing of the motor by inserting bolts through bore holes 11.11, 11.21 and screwing them into corresponding threaded bore holes in the housing of the motor.

Next, hollow shaft 21 is fastened to the motor shaft. For this purpose, a ring element 24 having a conical inner surface 24.3 and a spring ring 22 are provided on the rotary encoder, spring ring 22 being arranged between outer surface 21.22 of ridge 21.2 and inner surface 24.3 of ring element 24, and engaging, in particular, in groove 21.21. A geometric area may be centrally defined by spring ring 22, which is orthogonally penetrated by axis A. This plane is denoted as cross section Q.

Figure 6:
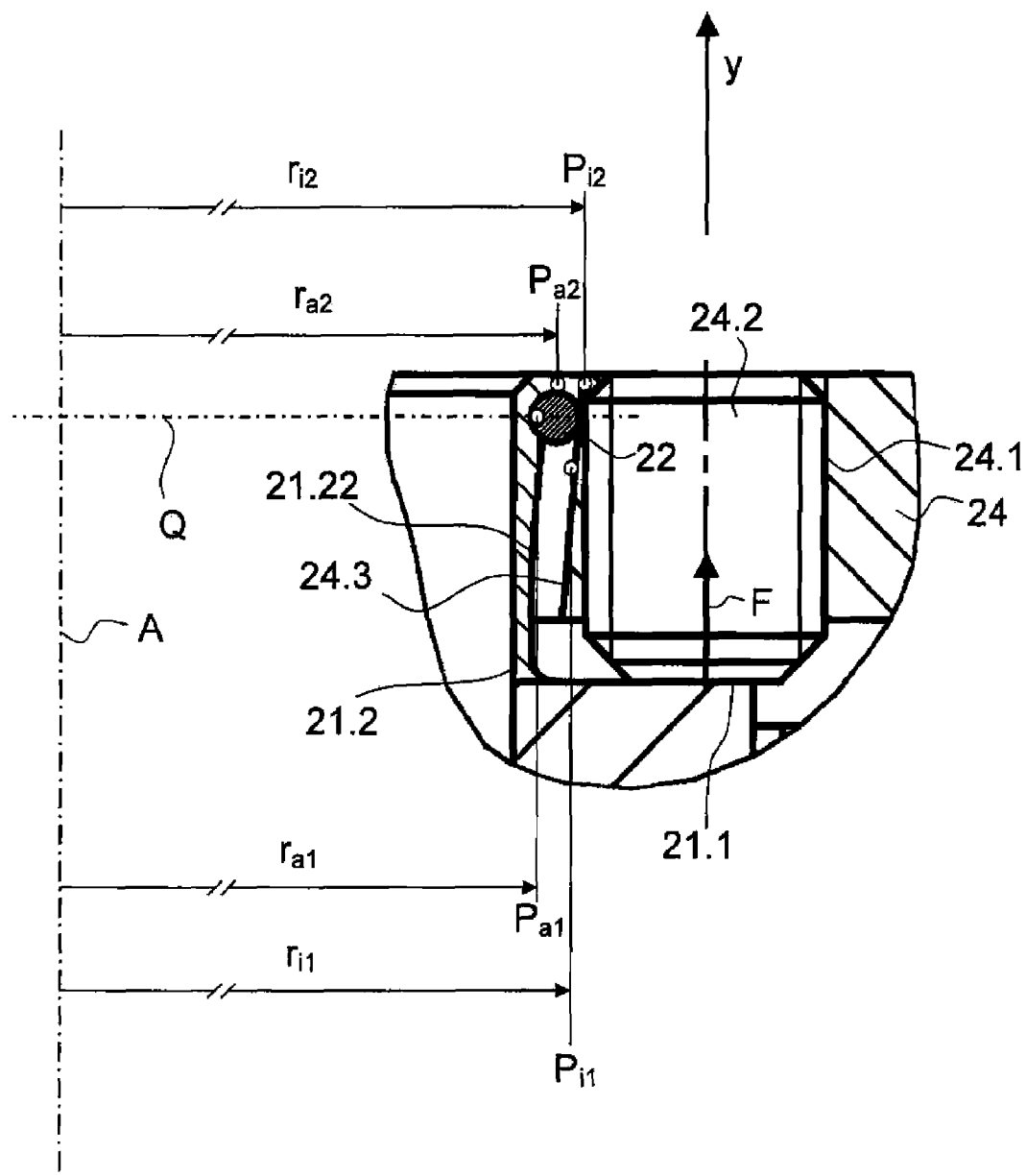
FIG. 6 is a partial cross-sectional view of the rotary encoder.

As illustrated in FIG. 6, constructively, a geometric system is created in which both points $P_{i1}$, $P_{i2}$ on inner surface 24.3 of ring element 24 as well as points $P_{a1}$, $P_{a2}$ on outer surface 21.22 of hollow shaft 21 or of ridge 21.2 are definable, which have different distances $r_{i1}$, $r_{i2}$; $r_{a1}$, $r_{a2}$ with respect to axis A. As mentioned above, a plane cross section Q may pass through spring ring 22, first point $P_{a1}$ coming to be located or being definable in the plane of cross section Q on outer surface 21.22 of shaft 21.

Starting from cross section Q of spring ring 22 in a direction counter to the y-direction (−y, that is, downward in FIG. 6) a virtual geometric first point $P_{i1}$ is definable on inner surface 24.3 of ring element 24. In the y-direction (upward in FIG. 6), on the other hand, a second point $P_{i2}$ is definable or arranged on inner surface 24.3 and second point $P_{a2}$ is definable or arranged on outer surface 21-22. Radial distance $r_{i1}$ of first point $P_{i1}$ on inner surface 24.3 with respect to axis A is smaller than distance $r_{i2}$ of second point $P_{i2}$ on inner surface 24.3 with respect to axis A. Moreover, distance $r_{a1}$ of first point $P_{a1}$ on outer surface 21.22 with respect to axis A is also smaller than distance $r_{a2}$ of second point $P_{a2}$ on outer surface 21.22 with respect to axis A.

In the course of installation, set screws 24.2 are screwed into threaded bore holes 24.1 of ring element 24 such that ring element 24 rests by set screws 24.2 on shoulder 21.1. A reaction force F is thereby applied on ring element 24 in a direction y, which is oriented parallel to axis A. Ring element 24 moves in the y-direction and presses onto spring ring 22 in groove 21.21. In the process, a force acts radially in the direction of the interior and ridge 21.2 is pressed radially toward the interior such that the motor shaft inserted into hollow shaft 21 is clamped in a rotatably fixed manner. This clamping also fixes hollow shaft 21 axially on the motor shaft. Due to this arrangement, very high clamping forces are achieved in the process because, on the one hand, groove 21.21 is set far apart from shoulder 21.1, that is, from the base or the root of ridge 21.2 and, on the other hand, due to the conical design of ridge 21.2, the latter is configured to be very thin-walled on the base. Accordingly, high bending moments are applied via spring ring 22, while ridge 21.2 has a comparatively small resistance moment. The resistance moment of ridge 21.2 is additionally reduced by slots 21.23, which are oriented staggered in the circumferential direction parallel to axis A.

After stator 10 is fixed on the housing of the motor and rotor 20 is fixed on the motor shaft, the lock that is set to maintain the factory-adjusted axial distance between code disk 23 and circuit board 13 may be released. This is done by turning clamping ring 12 counterclockwise relative to housing 11. Thus, cams 12.2 are brought into the tapered regions of wedge-shaped elements 11.12, and the clamping between first housing part 11.1 and hollow shaft 21 is released. Air gap s is in this position greater than zero, and the measuring operation may be initiated.

What is claimed is:

1. A rotary encoder, comprising:
    a first component group including a detector system, a housing part having at least one wedge-shaped element, and a clamping ring having at least one cam; and
    a second component group including a code disk and a shaft;
    wherein the first component group and the second component group are rotatable relative to each other, about an axis, in a measuring operation;
    wherein the detector system is configured to scan the code disk in the measuring operation to determine a relative angular position of the two component groups with respect to each other; and
    the housing part is arranged radially outside of the shaft, a force having a radial directional component oriented toward the axis applicable on the at least one wedge-shaped element via the at least one cam by a turning motion of the clamping ring relative to the housing part to clamp the shaft on the housing part outside of the measuring operation.

2. The rotary encoder according to claim 1, wherein the clamping ring includes a plurality of cams, a plurality of wedge-shaped elements being arranged on the housing part, surfaces of the wedge-shaped elements facing the shaft being concavely curved.

3. The rotary encoder according to claim 1, wherein the first component group is arranged across from the second component group without a bearing.

4. The rotary encoder according to claim 1, wherein the at least one wedge-shaped element is permanently attached to the housing part.

5. The rotary encoder according to claim 1, wherein the shaft is clampable on the housing part by a frictional lock.

6. The rotary encoder according to claim 1, wherein the rotary encoder is configured to operate according to an inductive measuring principle.

7. The rotary encoder according to claim 6, wherein the detector system includes a circuit board having exciter and receiver circuit traces.

8. The rotary encoder according to claim 6, wherein the code disk includes alternating electrically conductive and non-conductive scale-division regions.

9. The rotary encoder according to claim 1, wherein the shaft is adapted to attach to a motor shaft, the rotary encoder configured to determine an angular position of the motor shaft with respect to a motor housing.

10. The rotary encoder according to claim 1, wherein the shaft is arranged as a hollow shaft.

11. The rotary encoder according to claim 1, wherein the clamping ring is formed of plastic.

12. The rotary encoder according to claim 1, wherein the housing part is formed of plastic.

13. The rotary encoder according to claim 1, wherein a surface of at least one of (a) the shaft and (b) the wedge-shaped element is roughened to increase retention forces of the clamping.

14. The rotary encoder according to claim 13, wherein the roughened surface includes a knurling.

15. The rotary encoder according to claim 1, wherein the rotary encoder operates according to an inductive measuring principle.

16. The rotary encoder according to claim 1, wherein the shaft is attachable to a motor shaft, an angular position of the motor shaft with respect to a motor housing being determinable by the rotary encoder.

* * * * *